United States Patent
Feng et al.

(10) Patent No.: US 9,777,179 B2
(45) Date of Patent: Oct. 3, 2017

(54) INK SET INCLUDING A PRE-TREATMENT FIXING FLUID AND A FIXABLE, UV CURABLE INK

(71) Applicant: Hewlett-Packard Development Company, L.P., Houston, TX (US)

(72) Inventors: Yi Feng, San Diego, CA (US); Yubai Bi, San Diego, CA (US); Daniel Vincent Keane, San Diego, CA (US); Ali Emamjomeh, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/103,297

(22) PCT Filed: Jan. 28, 2014

(86) PCT No.: PCT/US2014/013332
§ 371 (c)(1),
(2) Date: Jun. 9, 2016

(87) PCT Pub. No.: WO2015/116028
PCT Pub. Date: Aug. 6, 2015

(65) Prior Publication Data
US 2016/0304734 A1    Oct. 20, 2016

(51) Int. Cl.
*C09D 11/54* (2014.01)
*C09D 11/326* (2014.01)
(Continued)

(52) U.S. Cl.
CPC ........... *C09D 11/54* (2013.01); *B41J 11/0015* (2013.01); *B41M 5/0017* (2013.01);
(Continued)

(58) Field of Classification Search
None
See application file for complete search history.

(56) References Cited

U.S. PATENT DOCUMENTS 8,048,937 B2   11/2011   Heischkel et al.
8,414,695 B2   4/2013    Robertson et al.
(Continued)

FOREIGN PATENT DOCUMENTS

EP   2363436   9/2011
EP   2660066   11/2013
(Continued)

OTHER PUBLICATIONS

International Search Report and Written Opinion for International Application No. PCT/US2014/013332 dated Oct. 24, 2014, 13 pages.
(Continued)

*Primary Examiner* — An Do
*Assistant Examiner* — Renee I Wilson
(74) *Attorney, Agent, or Firm* — HP Inc. Patent Department (57) ABSTRACT

An ink set includes a pre-treatment fixing fluid including at least two metal salts and a fixable, ultraviolet (UV) curable ink. The UV curable ink includes an aqueous ink vehicle, a pigment dispersed in the aqueous ink vehicle, and a dispersant. A polyurethane polymer dispersion is suspended as droplets within the aqueous ink vehicle. The polyurethane polymer dispersion includes a polyurethane polymer selected from the group consisting of a polyether-based polyurethane, a polyester-based polyurethane, a polycarbonate-based polyurethane, and mixtures thereof. The polyurethane polymer has i) an acid number ranging from 0 mg/g to less than 20 mg/g and ii) a glass transition temperature of less than 0 C. A water soluble or water dispersible photoinitiator is present in the pre-treatment fixing fluid or in the fixable, UV curable ink.

14 Claims, 2 Drawing Sheets

(51) Int. Cl.
*C09D 11/36* (2014.01)
*B41J 11/00* (2006.01)
*C09D 11/102* (2014.01)
*B41M 7/00* (2006.01)
*B41M 5/00* (2006.01)
*C09D 11/40* (2014.01)
*C09D 11/101* (2014.01)

(52) U.S. Cl.
CPC ......... *B41M 7/0081* (2013.01); *C09D 11/101* (2013.01); *C09D 11/102* (2013.01); *C09D 11/326* (2013.01); *C09D 11/36* (2013.01); *C09D 11/40* (2013.01)

(56) References Cited

U.S. PATENT DOCUMENTS

| | | |
|---|---|---|
| 2002/0198289 A1 | 12/2002 | Gummeson |
| 2009/0270581 A1 | 10/2009 | Tielemans et al. |
| 2010/0295891 A1 | 11/2010 | Goto et al. |
| 2010/0313782 A1 | 12/2010 | Loccufier et al. |
| 2012/0046378 A1 | 2/2012 | Sloan |
| 2013/0076842 A1 | 3/2013 | Sarkisian et al. |
| 2013/0088543 A1* | 4/2013 | Tsuji .................. B41J 2/01 347/21 |
| 2013/0307914 A1 | 11/2013 | Chen et al. |

FOREIGN PATENT DOCUMENTS

| | | |
|---|---|---|
| WO | WO-2012022962 | 2/2012 |
| WO | WO-2012058534 | 5/2012 |
| WO | WO-2013007598 | 1/2013 |

OTHER PUBLICATIONS

The Extended European Search Report for International Application No. PCT/US2014/013332 date Dec. 23, 2016, 8 pages.

* cited by examiner

INK SET INCLUDING A PRE-TREATMENT FIXING FLUID AND A FIXABLE, UV CURABLE INK

BACKGROUND

Inkjet printing is a popular printing technique for recording images on a variety of media, including plain paper and photo paper. Inkjet printers typically form ink droplets using heat or mechanical vibration. As an example, thermal inkjet printers include resistors that create heat, which vaporizes ink in an ink nozzle on a cartridge to create a bubble. As the bubble expands, some of the ink is pushed out of the ink nozzle and onto the desired medium. The ink used may include a colorant, a binder, and some combination of other ingredients to achieve desired print quality and/or printer performance.

BRIEF DESCRIPTION OF THE DRAWINGS

Features and advantages of examples of the present disclosure will become apparent by reference to the following detailed description and drawings.

DETAILED DESCRIPTION

Examples of the ink set disclosed herein include a pre-treatment fixing fluid and an ultraviolet curable ink that is fixable by the pre-treatment fixing fluid. The fact that the ultraviolet curable ink is fixable by the pre-treatment fixing fluid is advantageous because high quality (e.g., sharp image, high optical density, etc.) and durable prints can be achieved while the printing process is streamlined. As one example, since a relatively low molecular weight, cross-linkable polyurethane polymer is included directly in the ink, the need for printing an additional binder fluid over the image to achieve durable prints is eliminated. As another example, the pre-treatment fixing fluid and the ink disclosed herein can be applied in a wet-on-wet application, and thus faster printing speeds can be obtained. As still another example, metal salts in the pre-treatment fixing fluid immobilize the pigments in the ink to achieve high image quality, thereby eliminating the need for an extra pinning step (i.e., brief UV exposure to immobilize pigments) before drying and curing takes place. With these advantages, the ink set disclosed herein may be particularly suitable for high speed, web based printing in which a varied speed, ranging from about 100 ft/min to about 1000 ft/min, is typically used.

As mentioned above, the ink set includes the UV curable ink. In the examples disclosed herein, the UV curable ink includes a polyurethane polymer dispersion suspended as droplets in the ink. The polyurethane polymer i) is non-reactive, or is less reactive than the pigments in the ink, with the components of the pre-treatment fixing fluid, ii) has a relatively low molecular weight, iii) has an acid number ranging from 0 mg/g to less than 20 mg/g, and iv) has a glass transition temperature of less than 0° C. These characteristics of the polyurethane polymer contribute to the UV curable ink being a stable dispersion that is reliably jettable via a thermal inkjet printhead. The UV curable ink, including its polyurethane polymer dispersion, will now be described in more detail.

The UV curable ink includes an aqueous ink vehicle, pigment, a dispersant, the polyurethane polymer dispersion suspended as droplets in the aqueous ink vehicle. In some instances, the UV curable ink also includes a water soluble or water dispersible photoinitiator dissolved or dispersed in the aqueous ink vehicle.

The "aqueous ink vehicle" of the UV curable ink refers to the liquid fluid in which the pigment, dispersant, polyurethane polymer dispersion, and photoinitiator are placed to form the UV curable ink. The aqueous ink vehicle may include water, either alone or in combination with a mixture of a variety of different agents. Examples of these agents may include co-solvents, surfactants, anti-kogation agents, antimicrobial agents, and the like. As will be discussed further below, the aqueous ink vehicle may also include a pH buffering agent. As will also be discussed further below, one or more of the components of the aqueous ink vehicle may be added as part of another dispersion (e.g., in a pigment dispersion) or may be added as a separate component.

The co-solvent may be present in the UV curable ink in a total amount ranging from about 1 wt % to about 30 wt %, depending, at least in part, on the jetting architecture. In an example, a total amount of the co-solvent(s) present in the UV curable ink is about 5.0 wt % (with respect to the total wt % of the UV curable ink). It is to be understood that other amounts outside of this example and range may also be used. Classes of co-solvents that can be used can include organic co-solvents, such as aliphatic alcohols, aromatic alcohols, polyols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-diols, 1,3-diols, 1,5-diols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the co-solvent is selected from N-(2-hydroxyethyl)-2-pyrrolidone, 2-methyl-1,3-propanediol, 2-pyrrolidone, a mixture of 2-methyl-1,3-propanediol and isopropanol, triethylene glycol monobutyl ether, and combinations thereof.

A non-ionic surfactant may be present in the UV curable ink in an amount ranging from about 0.05 wt % to about 5 wt %, based on the total wt % of the UV curable ink. In at least some implementations, the UV curable ink may include a self-emulsifiable wetting agent based on acetylenic diol chemistry (e.g., SURFYNOL® SE-F surfactant from Air Products and Chemicals, Inc.).

An anti-kogation agent may also be included in the UV curable ink. Kogation refers to the deposit of dried ink on a heating element of a thermal inkjet printhead. Anti-kogation agent(s) is/are included to assist in preventing the buildup of kogation. One example of a suitable anti-kogation agent is oleth-3-phosphate (commercially available as CRODAFOS™ O3A or CRODAFOS™ N-3 acid). The anti-kogation agent may be present in the UV curable ink in an amount ranging from about 0.1 wt % to about 2 wt % of the total wt % of the UV curable ink.

Antimicrobial agents, such as biocides and fungicides, may be added to inhibit the growth of harmful microorganisms. Example antimicrobial agents may include the NUOSEPT® (Ashland Inc.), UCARCIDE™ or KORDEK™ (Dow Chemical Co.), and PROXEL® (Arch Chemicals) series, and combinations thereof. A total amount of the antimicrobial agents in the UV curable ink may range from about 0.05 wt % to about 1 wt %.

Even when aqueous ink vehicle includes one or more of the above-mentioned additives, it is to be understood that water makes up the balance of the UV curable ink and may be the predominant ingredient.

A pigment and a dispersant are also included in the fixable, UV curable ink. In an example, the pigment and dispersant are initially part of a pigment dispersion that is added to (or has added thereto) the other ink components (e.g., the polyurethane polymer dispersion, additive(s), water, etc.) to form the UV curable ink. In addition to the pigment and dispersant, the pigment dispersion may also include water and one or more of the previously described co-solvents.

The pigment dispersion may have an acid number ranging from about 100 mg/g to about 250 mg/g. In another example, the acid number of the pigment dispersion ranges from about 160 mg/g to about 215 mg/g. In the examples disclosed herein, the pigment dispersion that is incorporated into the UV curable ink may have a pH ranging from about 8.5 to about 9.0 after pH adjustment.

The pigment may be any suitable organic and/or inorganic pigment. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof. As examples, suitable pigments include Pigment Yellow 74, quinacridone-based magenta pigments, Pigment Blue 15:3, and carbon black.

In addition to Pigment Blue 15:3, examples of other suitable blue or cyan organic pigments include C.I. Pigment Blue 1, C.I. Pigment Blue 2, C.I. Pigment Blue 3, C.I. Pigment Blue 15, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Some examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

In addition to Pigment Yellow 74, some other examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

As previously mentioned, carbon black is a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® RO100, STANDART® RO200, and DORADO® gold-bronze pigments (available from Eckart Effect Pigments, Wesel, Germany).

The total amount of pigment in the UV curable ink ranges from about 1 wt % to about 5 wt % (based on the total wt % of the UV curable ink). The average particle size of the pigments may range anywhere from about 80 nm to about 220 nm.

The dispersant may be included to disperse the pigment in the pigment dispersion, and ultimately in the UV curable ink. The dispersant may be present in the UV curable ink an amount ranging from about 0.1 wt % to about 7.5 wt % based on a total wt % of the ink.

Examples of the dispersant include polystyrene-acrylic-type dispersants such as, acrylic dispersants having i) hydrophilic monomers including acidic monomers and ii) hydrophobic monomers.

Acidic monomers may be present in the acrylic dispersant in an amount ranging from about 0.1 wt % to about 30 wt % (based on the total wt % of the dispersant). Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinyl-succinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be included in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and combinations thereof.

Some suitable commercially available dispersants include JONCRYL® 683 and JONCRYL® 671 (BASF Corp.), or E-SPERSE® 100 (Ethox Chemicals, LLC).

As mentioned above, the pigment and dispersant may be incorporated into the UV curable ink in the form of a pigment dispersion. Some example formulations of the pigment dispersion are shown in TABLE 1. Water makes up a balance of the pigment dispersions.

TABLE 1

Pigment Dispersions

| Pigment Dispersion Color | Pigment Type (wt %) | Dispersant Type (wt %) | Co-solvent (wt %) | Avg. Pigment Particle Size (nm) |
|---|---|---|---|---|
| Yellow | Pigment Yellow 74 (15) | JONCRYL ® 683 (7.5) | 2-methyl-1,3-propanediol (7.9) and isopropanol (2) | 130 |
| Magenta | Quinacridone (15) | E-SPERSE ® 100 (3.25) and JONCRYL ® 683 (1.5) | 2-methyl-1,3-propanediol (5) | 90 |
| Cyan | Pigment Blue 15:3 (20) | JONCRYL ® 671 (6) | 2-pyrrolidone (20) | 120 |
| Black | Carbon black (20) | JONCRYL ® 671 (5.5) | 2-pyrrolidone (20) | 84-94 |

The pigment dispersions may be added to (or have added thereto) the other ink components (e.g., the polyurethane polymer dispersion, additive(s), water, etc.) to form the UV curable ink. In the final UV curable ink, it is to be understood that the pigment dispersion is diluted so that the total wt % of the pigment is in accordance with the range provided herein (e.g., from about 1 wt % to about 5 wt %).

The UV curable ink also includes the polyurethane polymer dispersion (PUD). While the polyurethane polymer dispersion is present as droplets suspended in the aqueous ink vehicle, it is to be understood that on the macro level, the UV curable ink disclosed herein may visually appear to have a uniform phase.

The polyurethane polymer dispersion includes the polyurethane polymer dispersed in water. The polyurethane polymer acts as a binder that contributes to the durability of the prints formed with the ink set disclosed herein. The polyurethane polymer may be a polyether-based polyurethane, a polyester-based polyurethane, or a polycarbonate-based polyurethane. In general, the characteristics of the polyurethane polymer include: a weight average molecular weight ranging from about 1,000 to about 10,000, an acid number ranging from 0 mg/g to less than 20 mg/g, and a glass transition temperature ($T_g$) of less than 0° C.

In an example, the polyurethane polymer is a (meth) acrylated polyurethane pre-polymer (A) obtained from the reaction of at least one polyisocyanate compound (i); optionally at least one polyol (ii); at least one hydrophilic compound (iii) containing at least one reactive group which is capable of reacting with isocyanate groups and rendering the polyurethane pre-polymer dispersible in an aqueous medium either directly or after the reaction with a neutralizing agent to provide a salt; at least one (meth)acrylated compound (iv) containing at least two reactive groups capable of reacting with isocyanate groups; and at least one (meth)acrylated compound (v) containing essentially one reactive group capable of reacting with isocyanate groups.

This (meth)acrylated polyurethane pre-polymer may be included in an aqueous composition which may, in some instances, also include at least one ethylenically unsaturated compound (B) (i.e., a component including carbon-carbon double bonds which under the influence of irradiation and/or a photoinitiator can undergo radical polymerization). This forms a pre-polymer composition that can be neutralized by the addition of either triethylamine or potassium hydroxide.

A polyurethane polymer dispersion is formed by either adding the pre-polymer composition to water, or by adding water to the pre-polymer composition under constant agitation.

In an example, the polyurethane polymer dispersion includes a total amount of (meth)acrylated and, optionally, polymerizable ethylenically unsaturated groups ranging from 1 to 8 meq per total weight in g of (i), (ii), (iii), (iv), (v) and (B). The amount of (meth)acrylated and ethylenically unsaturated groups may be measured by nuclear magnetic resonance spectroscopy and may be expressed in meq per g of solid material, as described in U.S. Patent Publication 2009/0270581. In an example, the polyurethane polymer dispersion includes from about 35 wt % to about 40 wt % of the solid polyurethane dispersed in water.

Examples of (i), (ii), (iii), (iv), (v) and (B) are provided herein. It is to be understood that the process described in U.S. Patent Publication 2009/0270581 may be used to prepare the polyurethane polymer (e.g., the (meth)acrylated polyurethane pre-polymer (A)) using the examples of (i), (ii), (iii), (iv), and (v), and to prepare a polyurethane dispersion including that polyurethane polymer and, optionally compound (B).

Examples of the polyisocyanate compound (i) include organic compounds comprising at least two isocyanate groups, and in some instances, not more than three isocyanate groups. The polyisocyanate compound is generally selected from aliphatic, cycloaliphatic, aromatic and/or heterocyclic polyisocyanates or combinations thereof. Some specific examples of aliphatic and cycloaliphatic polyisocyanates are 1,6-diisocyanatohexane (HDI), 1,1'-methylene bis[4-isocyanatocyclohexane] (H12MDI), and 5-isocyanato-1-isocyanatomethyl-1,3,3-trimethylcyclohexane (isophorone diisocyanate, IPDI). Aliphatic polyisocyanates containing more than two isocyanate groups are, for example, the derivatives of above mentioned diisocyanates like 1,6-diisocyanatohexane biuret and isocyanurate. Some examples of aromatic polyisocyanates are 1,4-diisocyanatobenzene (BDI), 2,4-diisocyanatotoluene (TDI), 1,1'-methylenebis[4-isocyanatobenzene] (MDI), xylilene diisocyanate (XDI), tetramethylxylilene diisocyanate (TMXDI), 1,5-naphtalene diisocyanate (NDI), tolidine diisocyanate (TODI) and p-phenylene diisocyanate (PPDI).

Polyol (ii) may be any polyol including at least two hydroxyl groups. The polyol (ii) can be selected from high molecular weight polyols having a number average molecular weight of at least 400 but not exceeding 5000, low molecular weight polyols having a number average weight of lower than 400, or any mixtures thereof.

Examples of such high molecular weight polyols are polyester polyols, polyether polyols, polycarbonate polyols, fatty dimer diols, polybutadiene polyols, silicone polyols and polyacrylate polyols, as well as combinations thereof.

Some examples of suitable polyester polyols are made from the polycondensation of neopentylglycol and adipic acid and/or isophthalic acid. Other examples of polyester polyols include the hydroxyl terminated reaction products of polyhydric alcohols with polycarboxylic acids or their corresponding anhydrides, as well as those obtained from the ring opening polymerization of lactones. The polycarboxylic acids which may be used for the formation of these polyester polyols may be aliphatic, cycloaliphatic, aromatic and/or heterocyclic and they may be substituted, saturated or unsaturated. Examples of dicarboxylic acids are succinic acid, glutaric acid, adipic acid, suberic acid, azelaic acid, sebacic acid, dodecanedicarboxylic acid, hexahydrophthalic acid, isophthalic acid, terephthalic acid, ortho-phthalic acid, tetrachlorophthalic acids, 1,5-naphthalenedicarboxylic acid, fumaric acid, maleic acid, itaconic acid, citraconic acid, mesaconic acid, tetrahydrophthalic acid, trimellitic acid, trimesic acid and pyromellitic acid, or mixtures thereof. The polyester polyol may also contain an air-drying component, such as a long chain unsaturated aliphatic acid (e.g., a fatty acid dimer). Polyhydric alcohols which may be used for the preparation of the polyester polyols include ethylene glycol, propylene glycol, 1,3-propanediol, 1,3-butanediol, 1,4-butanediol, 1,5-pentanediol, 1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, 1,4-cyclohexanedimethanol, ethylene oxide adducts or propylene oxide adducts of bisphenol A or hydrogenated bisphenol A. In addition, other polyols, such as glycerin, trimethylolethane, trimethylolpropane, di-trimethylolethane, di-trimethylolpropane and pentaerythritol, may also be used.

Suitable polyether polyols may include polyethylene glycols, polypropylene glycols and polytetramethylene glycols, or block copolymers thereof. Suitable polycarbonate polyols may include the reaction products of diols, such as ethylene glycol, 1,3-propanediol, 1,3-butanediol, 1,4-butanediol, 1,5-pentanediol, 1,6-hexanediol, diethylene glycol, triethylene glycol, dipropylene glycol, tripropylene glycol or tetraethylene glycol, with phosgene, with dialkylcarbonates (e.g., dimethycarbonate), with diarylcarbonates (e.g., diphenylcarbonate), or with cyclic carbonates (e.g., ethylene and/or propylene carbonate). Suitable fatty dimer diols may be obtained from the hydrogenation of dimer acids, such as those including 36 carbon atoms. Suitable polyacrylate polyols include those prepared by the radical polymerization of (meth)acrylic and/or (meth)acrylamide monomers initiated by a thermal radical initiator in the presence of an hydroxylated mercaptan and followed by the end-group transesterification with a short chain diol, such as 1,4-butanediol.

Examples of low molecular weight polyols are ethyleneglycol, diethyleneglycol, propyleneglycol, dipropyleneglycol, neopentyl glycol, 1,3-propane diol, 2-ethyl-2-butyl-1,3-propanediol, 1,3-butanediol, 1,4-butanediol, 1,5-pentanediol, 1,6-hexanediol, 1,7-heptanediol, 1,8-octanediol, 2-ethyl-1,6-hexanediol, cyclohexane dimethanol, trimethylolpropane, di-trimethylol propane, glycerol, pentaerythritol, and di-pentaerythritol.

The hydrophilic compound (iii) is generally a polyol including a functional group that can exhibit an ionic or non-ionic hydrophilic nature. In an example, the hydrophilic compound (III) is a polyol containing one or more anionic salt groups, such as a carboxylate and sulfonate salt groups or acid groups which may be converted to an anionic salt group, such as carboxylic acid or sulfonic acid groups. Specific examples include hydroxycarboxylic acids, such as citric acid, malic acid, lactic acid, tartaric acid, 2,2-dimethylolpropionic acid, and 2,2-dimethylolbutanoic acid.

The (meth)acrylated compound (iv) includes compounds that contain at least one (meth)acrylated function, such as an acrylic or methacrylic group, and at least two nucleophilic functions capable of reacting with isocyanate, preferably hydroxyl functions. Examples include (meth)acryloyl dihydroxy compounds and poly(meth)acryloyl dihydroxy compounds. Examples of the (meth)acrylated compound (iv) may be obtained from the reaction of diglycidyl compounds with (meth)acrylic acid. Other examples of the (meth)acrylated compound (iv) may be obtained from partial esterification of aliphatic or aromatic polyhydric polyols with (meth)acrylic acid and having a residual average hydroxyl functionality of at least 2.0 in the molecule. Still other examples of the (meth)acrylated compound (iv) may be obtained from the hydrolysis of aliphatic, cycloaliphatic or aromatic compounds bearing an epoxy functionality together with at least one (meth)acrylic functionality can be used as well.

The (meth)acrylated compound (v) may be any compound including at least one unsaturated function, such as acrylic or methacrylic group, and one nucleophilic function capable of reacting with isocyanate, such as an hydroxyl group. Examples include (meth)acryloyl mono-hydroxy compounds, such as poly(meth)acryloyl mono-hydroxy compounds. Useful compounds (v) include the esterification products of aliphatic and/or aromatic polyols with (meth)acrylic acid having a residual average hydroxyl functionality of about 1. The partial esterification products of (meth)acrylic acid with tri-, tetra-, penta- or hexahydric polyols or mixtures thereof may also be used. It may also be possible to use reaction products of such polyols with ethylene oxide and/or propylene oxide or mixtures thereof, or reaction products of such polyols with lactones, which add to these polyols in a ring-opening reaction. These modified or unmodified polyols are partly esterified with acrylic acid, methacrylic acid or mixtures thereof until the desired residual hydroxyl functionality is reached. Still further, compounds (v) may be obtained from the reaction of (meth)acrylic acid with aliphatic, cycloaliphatic or aromatic compounds bearing an epoxy functionality together with at least one (meth)acrylic functionality. It is also contemplated that (meth)acrylic esters with linear and branched polyols in which at least one hydroxy functionality remains free, like hydroxyalkyl(meth)acrylates having 1 to 20 carbon atoms in the alkyl group, may be used.

The ethylenically unsaturated compound (B) can be selected from the (meth)acrylated compounds (iv) and (v) as described here above or can be an ethylenically unsaturated compound which include no functionality which is capable to react with an isocyanate group.

The (meth)acrylated polyurethane pre-polymer formed using the examples of (i), (ii), (iii), (iv), and (v), alone or in an aqueous polyurethane polymer dispersion with or without compound (B), may be used as the polyurethane polymer in the examples of the UV curable ink disclosed herein.

A few commercially available polyurethane polymer dispersions are in accordance with the details provided herein, and may also be used in the examples disclosed herein. As an example, ALBERDINGK® LUX 260 (Alberdingk Boley) may be used as the polyurethane polymer dispersion that is incorporated into the UV curable ink.

In general, the amount of polyurethane polymer (i.e., solid polyurethane) present in the UV curable ink is greater than the amount of pigment that is present in the UV curable ink. As an example, the polyurethane polymer may be present in the UV curable ink in an amount ranging from about 3 wt % to about 20 wt % of a total wt % of the UV curable ink. As another example, the polyurethane polymer may be present in the UV curable ink in an amount ranging from about 5 wt % to about 10 wt % of a total wt % of the UV curable ink. The polyurethane polymer contributes to the total solids in the UV curable ink, and thus the total solids may change depending, at least in part, on the amount of polyurethane polymer dispersion that is added.

The polyurethane polymer dispersion may be added to (or have added thereto) the other ink components (e.g., the pigment dispersion, additive(s), water, etc.) to form the UV curable ink. In the final UV curable ink, it is to be understood that the polyurethane polymer dispersion is diluted so that the total wt % of the polyurethane polymer is in accordance with the range provided herein (e.g., from about 3 wt % to about 20 wt %).

In some examples, the UV curable ink also includes the water soluble or water dispersible photoinitiator. In other examples, as will be discussed below, the water soluble or water dispersible photoinitiator is incorporated into the pre-treatment fixing fluid. The photoinitiator is generally present in the UV curable ink in an amount that is less than 2 wt % of the total wt % of the ink. In an example, the photoinitiator may be present in the UV curable ink in an amount ranging from about 0.5 wt % to about 1.0 wt % of the total wt % of the UV curable ink. In an example, the photoinitiator is α(alpha)-hydroxyketone. An example of a suitable commercially available α-hydroxyketone class photoinitiator is IRGACURE® 2959 (BASF Corp.). Other examples of suitable photoinitiators include α-aminoketones, monoacylphosphine oxides, diacylphenylphosphine oxide, etc. Any other photoinitiator may be used as long as it is water soluble or can be made water dispersible.

A base may be used to adjust the pH of the UV curable ink to a particular pH. The pigment dispersion and polyurethane polymer dispersion that are incorporated into the UV curable ink are stable in a slightly basic environment. As such, the pH may be adjusted to achieve this slightly basic environment. Examples of suitable bases for the UV curable ink include potassium hydroxide or triethanolamine. In some examples, the base(s) may be used in an amount sufficient to adjust the pH of the UV curable ink so that it ranges from 7.5 to 9.5. In an example, the pH of the UV curable ink fluid is adjusted to about 8.5 using potassium hydroxide.

In some instances, additional water may be added to obtain a total weight percent of 100.

In an example of the method for making the UV curable ink, the polyurethane polymer dispersion and other ink components may be added to the pigment dispersion. In another example of the method for making the UV curable ink, the pigment dispersion may be added to the polyurethane polymer dispersion and the other ink components.

As a specific example of the method, a commercially available polyurethane polymer dispersion may be diluted with water. This forms a suspension which includes droplets of the polyurethane polymer dispersion in the water. Suitable amounts of the co-solvent, the anti-kogation agent, the non-ionic surfactant, and the photoinitiator may be added to the suspension. The pigment dispersion (including water, additional co-solvent(s), pigment, and dispersant) may then be added to the suspension. Each of these steps may be performed while agitating the components. The pH may be adjusted to the desirable slightly basic pH, and then the balance of water may be added. In some instances, the balance of water may not exceed 5 wt %, at least in part because water is added to initially dilute the polyurethane polymer dispersion.

The ink set disclosed herein also includes the pre-treatment fixing fluid. The pre-treatment fixing fluid is used to immobilize the pigments in the subsequently deposited ink, which controls and minimizes ink bleed and coalescence on various types of media (e.g., coated paper, offset media, etc.). The pre-treatment fixing fluid may also contribute to enhanced optical density, saturation, and/or text print quality.

The composition of the pre-treatment fixing fluid includes water and at least two metal salts. The metal salts may flocculate pigment in the UV curable ink and control pigment migration. Due, at least in part, to the highly reactive nature of the metal salts and the pigment(s), the metal salts generally exhibit a weaker interaction with the polyurethane polymer in the ink. This leaves the polyurethane polymer intact for UV curing and forming a durable print.

In some examples, the polyvalent metal salt component may be soluble in the water.

The metal salts may include a polyvalent metal cation. Examples of suitable divalent metal cations include $Ca^{2+}$, $Cu^{2+}$, $Ni^{2+}$, $Mg^{2+}$, $Zn^{2+}$, or a combination thereof. Examples of suitable trivalent metal cations include $Al^{3+}$, $Fe^{3+}$, or a combination thereof. Since $Cu^{2+}$, $Ni^{2+}$, and $Fe^{3+}$ are colored, these cations may be less desirable. In one example, the polyvalent metal cation may be $Ca^{2+}$. The metal salts may also include anions, examples of which include $Cl^-$, $I^-$, $Br^-$, $NO^{3-}$ or $RCOO^-$, where R is H or any straight or branched hydrocarbon chain including from 1 to 8 carbon atoms. In one example, the polyvalent metal anion may be a chloride ($Cl^-$) or an acetate ($CH_3COO^-$).

In other examples, the polyvalent metal salts may be composed of divalent or polyvalent metallic ions and of nitrate or carboxylate ions. The carboxylate ions may be derived from pantothenic acid, or a saturated aliphatic monocarboxylic acid having 1 to 6 carbon atoms, or a carbocyclic monocarboxylic acid having 7 to 11 carbon atoms. Examples of saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid.

Some specific examples of the polyvalent metal salts include combinations of any of: calcium propionate, calcium pantothenate, calcium chloride, calcium nitrate, magnesium nitrate, magnesium acetate, or zinc acetate. In an example, the polyvalent metal salts include a combination of calcium propionate and calcium pantothenate.

The metal salt may be included in the pre-treatment fixing fluid at a concentration suitable for fixing pigment in the UV curable ink. In an example, the metal salt may be present in an amount ranging from about 3 wt % to about 10 wt %. In an example, the pre-treatment fixing fluid may include calcium propionate in an amount ranging from about 3 wt % to about 10 wt % and calcium pantothenate in an amount ranging from about 3 wt % to about 7 wt %. In another example, the pre-treatment fixing fluid may include about 6.5 wt % of calcium propionate and about 4.8 wt % of calcium pantothenate. While a few examples have been given herein, it is to be understood that other combinations and amounts of the metal salt(s) may be possible within the scope of the present disclosure.

In some examples, the pre-treatment fixing fluid also includes the photoinitiator. In these examples, it is to be understood that the UV curable ink does not include the photoinitiator. Any examples of the photoinitiator previously discussed may be used. When included in the pre-treatment fixing fluid, the photoinitiator is generally present in an amount that is less than 2 wt % of the total wt % of the pre-treatment fixing fluid.

The pre-treatment fixing fluid may also include a mixture of a variety of different additives. Examples of these additives may include co-solvents, buffers, surfactants, antimicrobial agents, viscosity modifiers, materials for pH adjustment, sequestering agents, preservatives, and the like. The balance of the pre-treatment fixing fluid is water.

The co-solvent may be present in total in the pre-treatment fixing fluid in an amount ranging from about 2 wt % to about 20 wt %. When the pre-treatment fixing fluid is jetted, the amount of co-solvent may depend, at least in part, on the jetting architecture. In some examples, amounts outside of this range may also be used. Classes of co-solvents that can be used include organic co-solvents such as aliphatic alcohols, aromatic alcohols, diols, glycol ethers, polyglycol ethers, caprolactams, formamides, acetamides, and long chain alcohols. Examples of such co-solvents include primary aliphatic alcohols, secondary aliphatic alcohols, 1,2-diols, 1,3-diols, 1,5-diols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. As an example, the pre-treatment fixing fluid may include tetraethylene glycol.

Non-ionic, cationic, and/or anionic surfactants may be present in total in the pre-treatment fixing fluid in a range from about 0 wt % to about 5 wt %. In at least some implementations, the pre-treatment fixing fluid may include SURFYNOL® SE-F (Air Products and Chemicals, Inc.).

Antimicrobial agents, such as biocides and fungicides, may be added to inhibit the growth of harmful microorganisms. Example antimicrobial agents may include the NUOSEPT® (Ashland Inc.), UCARCIDE™ or KORDEK™ (Dow Chemical Co.), and PROXEL® (Arch Chemicals) series, and combinations thereof. A total amount of the antimicrobial agents in the pre-treatment fixing fluid may range from about 0.05 wt % to about 1 wt %. In an example, the pre-treatment fixing fluid includes about 0.1 wt % of a biocide.

Even when the pre-treatment fixing fluid includes one or more of the above-mentioned additives, water may be the predominant ingredient. Buffers may be used to adjust the pH of the pre-treatment fixing fluid to a particular pH. One example of a suitable buffer is methanesulfonic acid. In some examples, the buffer may be used in an amount sufficient to buffer the pH of the pre-treatment fixing fluid so that it ranges from 4.0 to 7.0. In an example, the pH of the pre-treatment fixing fluid is adjusted to about 6.6 using methanesulfonic acid.

Figure 1:
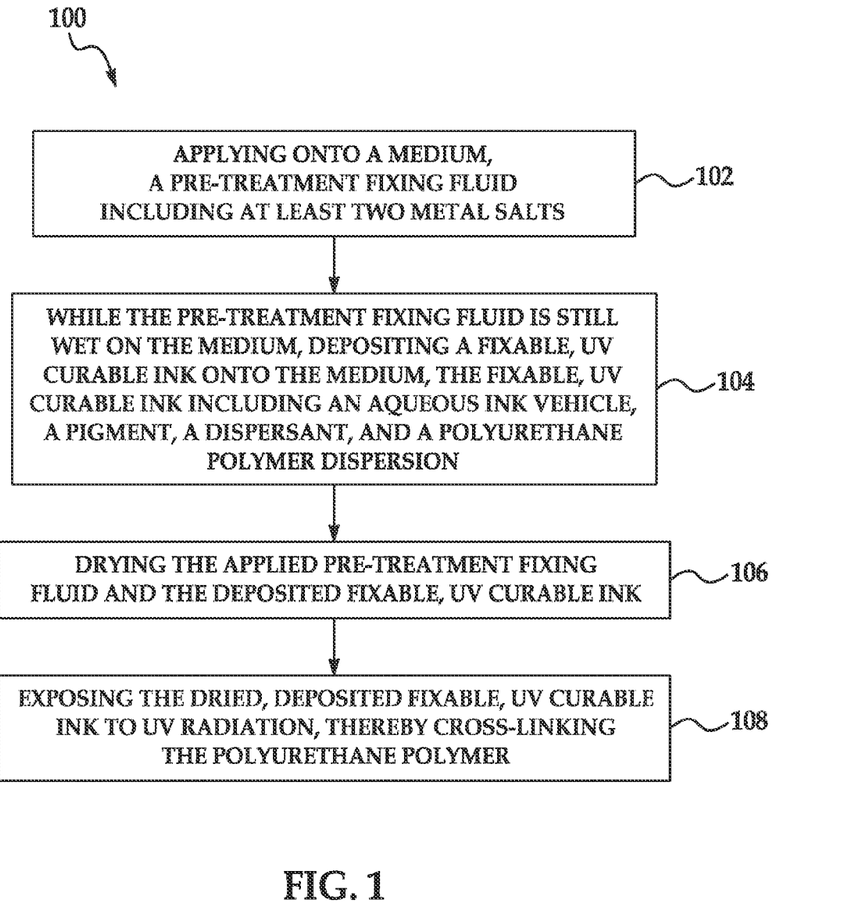
FIG. 1 is a flow diagram illustrating an example of a printing method using an example of an ink set disclosed herein.

An example of the printing method 100 using the ink set disclosed herein is shown in FIG. 1. At the onset of the method 100, as shown at reference numeral 102, the pre-treatment fixing fluid including the at least two metal salts is applied onto a medium. In an example, the pre-treatment fixing fluid is deposited with a thermal inkjet printer. In another example, non-inkjet application methods may be used to apply the pre-treatment fixing fluid, such as rollers, etc.

While the pre-treatment fixing fluid is still wet on the medium, the fixable, UV curable ink is deposited onto the medium, as shown at reference numeral 104. In an example, the UV curable ink is deposited using a thermal inkjet printer.

At reference numeral 106, the applied pre-treatment fixing fluid and the deposited fixable, UV curable ink are exposed to drying. Drying operation(s) may be performed at ambient temperature or under heat. Drying operation(s) may also be in-line with the printing process. In some examples, the drying operation may be performed at a temperature ranging from about 100° C. to about 190° C. for up to about 10 seconds.

The dried pre-treatment fixing fluid and ink are then exposed to ultraviolet radiation. This is shown at reference numeral 108 in FIG. 1. The UV radiation is emitted from a UV radiation source, such as a UV curing lamp, UV light emitting diodes (LED), or a mercury lamp with various dopants to tune the spectrum. The UV radiation source may also be in-line with pre-treatment fixing fluid and ink application/deposition as well as drying so that medium can be quickly moved through the process to form a printed image. When exposed to UV radiation, the photoinitiator in the ink initiates the cross-linking of the polyurethane polymer(s) in the ink to form a durable film on the printed image.

To further illustrate the present disclosure, examples are given herein. It is to be understood that these examples are provided for illustrative purposes and are not to be construed as limiting the scope of the disclosed example(s).

Example 1

A pre-treatment fixing fluid and four different UV curable inks according to an example disclosed herein were prepared. The formulations for each of the fluids are shown in the TABLES below.

TABLE 2

| Pre-Treatment Fixing Fluid | |
| --- | --- |
| Compositional Components | Weight Percent (wt %) |
| Calcium Propionate | 6.5 |
| Calcium Pantothenate | 4.8 |
| SURFYNOL ® SE-F | 0.05 |
| Tetraethylene Glycol | 12.0 |
| Methanesulfonic Acid | pH to 6.6 |
| Biocide | 0.2 |
| Water | Balance |

TABLE 3

| Ink | | | | |
| --- | --- | --- | --- | --- |
| Compositional Components | Ink 1 (wt %) | Ink 2 (wt %) | Ink 3 (wt %) | Ink 4 (wt %) |
| LUX 260 (polyurethane dispersion - noting that the wt % given is for total solid polyurethane) | 10 | 10 | 10 | 10 |
| Triethanolamine | 0.3 | 0.3 | 0.3 | 0.3 |
| 2-hydroxyethyl-2-pyrrolidone | 5.0 | 5.0 | 5.0 | 5.0 |
| CRODAFOS ® N-3 acid | 0.5 | 0.5 | 0.5 | 0.5 |
| SURFYNOL ® SE-F | 1.0 | 1.0 | 1.0 | 1.0 |

TABLE 3-continued

| Ink | | | | |
| --- | --- | --- | --- | --- |
| Compositional Components | Ink 1 (wt %) | Ink 2 (wt %) | Ink 3 (wt %) | Ink 4 (wt %) |
| IRGACURE ® 2959 | 1.0 | 1.0 | 1.0 | 1.0 |
| Pigment Yellow 74 | 4.0 | none | none | none |
| quinacridone-based magenta pigment | none | 3.5 | none | none |
| Pigment Blue 15:3 | none | none | 2.25 | none |
| Carbon Black Pigment | none | none | none | 2.75 |
| Potassium Hydroxide | pH to 8.5 | pH to 8.5 | pH to 8.5 | pH to 8.5 |
| Water | 78.2 | 78.7 | 79.95 | 79.45 |
| Total Solids | 16.8 | 16.3 | 15.1 | 15.6 |

The pigments shown in Table 3 were present in pigment dispersions that also included dispersant, co-solvent(s), and water. The wt % given in Table 3 is the total amount of the pigment that was included. The viscosity of the inks was as follows: Ink 1-3.1 cps, Ink 2=2.7 cps, Ink 3=15.1 cps, and Ink 4=2.6 cps. The surface tension of the inks was as follows: Ink 1-34.2 Dyne/cm, Ink 2=34.62 Dyne/cm, Ink 3=34.3 Dyne/cm, and Ink 4=34.27 Dyne/cm.

Inks 1-4 were printed on coated offset glossy media (i.e., STERLING® Ultra Gloss paper (NewPage Corp.)) and on uncoated media (i.e., White Kraft paper) with the pre-treatment fixing fluid (examples) and without the pre-treatment fixing fluid (comparative examples). The optical density OD for the example prints and the comparative example prints formed with Ink 2 was measured using an X-rite 500 series Spectrodensitometer.

Figure 2A:
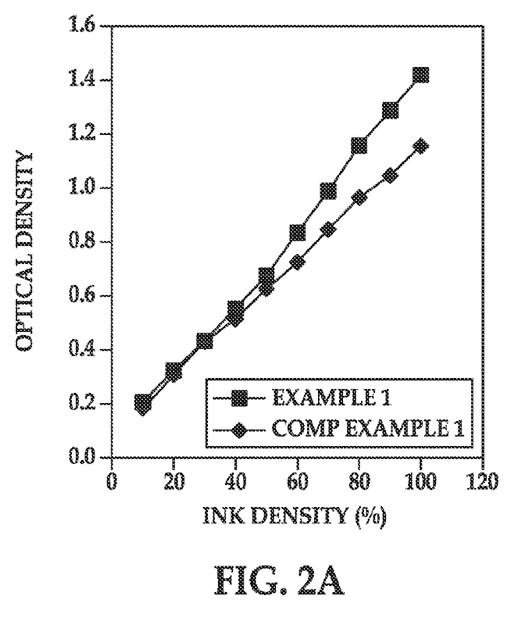
FIG. 2A is a graph illustrating the optical density of an example print formed on a glossy offset coated medium with a fixer and a fixable, ultraviolet (UV) curable ink and of a comparative print formed on the glossy offset coated media with a UV) curable ink and without a fixer.

The optical density of Ink 2 printed with the pre-treatment fixing fluid on coated offset glossy media (Example 1) and the optical density of Ink 2 printed without the pre-treatment fluid on coated offset glossy media (Comp Example 1) are shown in FIG. 2A. As illustrated, the optical density for Example 1 was better than for Comp Example 1, especially at higher ink density.

Figure 2B:
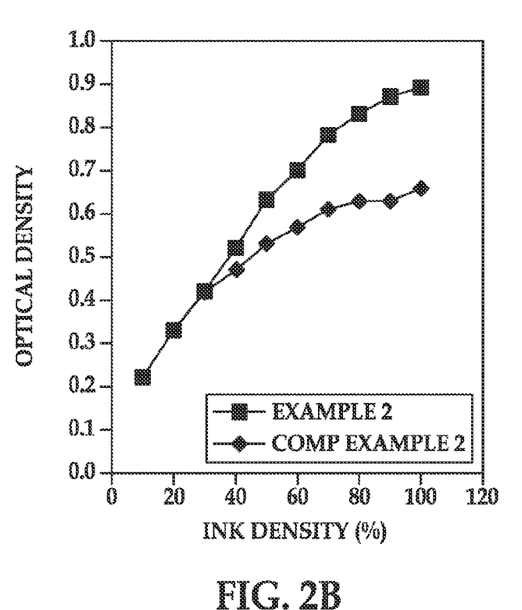
FIG. 2B is a graph illustrating the optical density of an example print formed on an uncoated medium (White Kraft paper) with a fixer and a fixable, ultraviolet (UV) curable ink and of a comparative print formed on the uncoated medium with a UV curable ink and without a fixer.

The optical density of Ink 2 printed with the pre-treatment fixing fluid on uncoated media (Example 2) and the optical density of Ink 2 printed without the pre-treatment fluid on uncoated media (Comp Example 2) are shown in FIG. 2B. As illustrated, the optical density for Example 2 was generally better than for Comp Example 2, especially at higher ink density.

As illustrated in both FIGS. 2A and 2B, the combination of the pre-treatment fixing fluid and the UV curable ink disclosed herein significantly enhances the optical density of the printed images, when compared to the ink used alone.

Example 2

Ink 4 from Example 1 was tested for durability. A comparative ink for was made according to the formulation in Table 3, except that the polyurethane dispersion was not included (rather additional water was added). Both Ink 4 and the comparative ink were printed on coated offset glossy media (i.e., STERLING® Ultra Gloss paper (NewPage Corp.)) and on uncoated media (i.e., White Kraft paper).

The durability was demonstrated by comparing the amount of black ink removal from the printed samples before and after wet rub with de-ionized water. Significant performance benefits (i.e., less mOD change) were observed with Ink 4 (including the polyurethane polymer dispersion) versus the comparative ink (that did not include the polyurethane polymer dispersion). The results are shown in Table 4. Example 3 is Ink 4 printed on coated offset glossy media; Comp Example 3 is the comparative ink printed on coated offset glossy media; Example 4 is Ink 4 printed on the uncoated media; and Comp Example 4 is the comparative ink printed on the uncoated media.

TABLE 4

Durability Results

|  | Change in mOD |
| --- | --- |
| Example 3 | 0.07 |
| Comp Example 3 | 1.16 |
| Example 4 | 0.02 |
| Comp Example 4 | 0.86 |

It is to be understood that the ranges provided herein include the stated range and any value or sub-range within the stated range. For example, a range from about 3 wt % to about 10 wt % should be interpreted to include not only the explicitly recited limits of about 3 wt % to about 10 wt %, but also to include individual values, such as 3.7 wt %, 8 wt %, etc., and sub-ranges, such as from about 5 wt % to about 7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Furthermore, in describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. An ink set, comprising:
   a pre-treatment fixing fluid including at least two metal salts; and
   a fixable, ultraviolet (UV) curable ink including:
      an aqueous ink vehicle, wherein the aqueous ink vehicle consists of: a co-solvent selected from the group consisting of N-(2-Hydroxyethyl)-2-pyrrolidone, 2-Methyl-1,3-Propanediol, 2-pyrrolidone, a mixture of 2-Methyl-1,3-Propanediol and isopropanol, and combinations thereof; a non-ionic surfactant; an anti-kogation agent a buffer; optionally a biocide; and a balance of water;
      a pigment dispersed in the aqueous ink vehicle;
      a dispersant; and
      a polyurethane polymer dispersion suspended as droplets within the aqueous ink vehicle, the polyurethane polymer dispersion including a polyurethane polymer selected from the group consisting of a polyether-based polyurethane, a polyester-based polyurethane, a polycarbonate-based polyurethane, and mixtures thereof, and the polyurethane polymer having i) an acid number ranging from 0 mg/g to less than 20 mg/g and ii) a glass transition temperature of less than 0° C.;
   wherein a water soluble or water dispersible photoinitiator is present in the pre-treatment fixing fluid or in the fixable, UV curable ink.

2. The ink set as defined in claim 1 wherein:
   an amount of the pigment in the fixable, UV curable ink ranges from about 1 wt % to about 5 wt % of a total wt % of the fixable, UV curable ink; and
   an amount of the polyurethane polymer ranges from about 3 wt % to about 20 wt % of the total wt % of the fixable, UV curable ink.

3. The ink set as defined in claim 1 wherein the polyurethane polymer has a weight average molecular weight ranging from about 1000 to about 10,000.

4. The ink set as defined in claim 1 wherein the fixable, UV curable ink further includes a sufficient amount of a base to render a pH of the fixable, UV curable ink from about 7.5 to about 9.5.

5. The ink set as defined in claim 1 wherein the photoinitiator is present in the fixable, UV curable ink an amount of 2 wt % or less of a total wt % of the fixable, UV curable ink.

6. The ink set as defined in claim 1 wherein the pigment is selected from the group consisting of Pigment Yellow 74, quinacridone-based magenta pigments, Pigment Blue 15:3, and carbon black.

7. The ink set as defined in claim 1 wherein the pre-treatment fixing fluid includes:
   calcium propionate and calcium pantothenate as the at least two metal salts;
   tetraethylene glycol;
   a surfactant;
   a biocide;
   an acid in an amount sufficient to render a pH of the pre-treatment fixing fluid from about 4.0 to about 7.0; and
   a balance of water.

8. An ink set, comprising:
   a pre-treatment fixing fluid including at least two metal salts, wherein the pre-treatment fixing fluid includes: calcium propionate and calcium pantothenate as the at least two metal salts; tetraethylene glycol; a surfactant; a biocide; an acid in an amount sufficient to render a pH of the pre-treatment fixing fluid from about 4.0 to about 7.0; and a balance of water; and
   a fixable, ultraviolet (UV) curable ink including:
      an aqueous ink vehicle;
      a pigment dispersed in the aqueous ink vehicle;
      a dispersant; and
      a polyurethane polymer dispersion suspended as droplets within the aqueous ink vehicle, the polyurethane polymer dispersion including a polyurethane polymer selected from the group consisting of a polyether-based polyurethane, a polyester-based polyurethane, a polycarbonate-based polyurethane, and mixtures thereof, and the polyurethane polymer having i) an acid number ranging from 0 mg/g to less than 20 mg/g and ii) a glass transition temperature of less than 0° C.;
   wherein a water soluble or water dispersible photoinitiator is present in the pre-treatment fixing fluid or in the fixable, UV curable ink.

9. The ink set as defined in claim 8 wherein:
   an amount of the pigment in the fixable, UV curable ink ranges from about 1 wt % to about 5 wt % of a total wt % of the fixable, UV curable ink; and an amount of the polyurethane polymer ranges from about 3 wt % to about 20 wt % of the total wt % of the fixable, UV curable ink.

10. The ink set as defined in claim 8 wherein the polyurethane polymer has a weight average molecular weight ranging from about 1000 to about 10,000.

11. The ink set as defined in claim 8 wherein the fixable, UV curable ink further includes a sufficient amount of a base to render a pH of the fixable, UV curable ink from about 7.5 to about 9.5.

12. The ink set as defined in claim 8 wherein the photoinitiator is present in the fixable, UV curable ink an amount of 2 wt % or less of a total wt % of the fixable, UV curable ink.

13. The ink set as defined in claim 8 wherein the pigment is selected from the group consisting of Pigment Yellow 74, quinacridone-based magenta pigments, Pigment Blue 15:3, and carbon black.

14. The ink set as defined in claim 8 wherein the aqueous ink vehicle consists of:
- a co-solvent selected from the group consisting of N-(2-Hydroxyethyl)-2-pyrrolidone, 2-Methyl-1,3-Propanediol, 2-pyrrolidone, a mixture of 2-Methyl-1,3-Propanediol and isopropanol, and combinations thereof;
- a non-ionic surfactant;
- an anti-kogation agent;
- a buffer;
- optionally a biocide; and
- a balance of water.

* * * * *

UNITED STATES PATENT AND TRADEMARK OFFICE
CERTIFICATE OF CORRECTION

PATENT NO. : 9,777,179 B2  
APPLICATION NO. : 15/103297  
DATED : October 3, 2017  
INVENTOR(S) : Yi Feng et al.

It is certified that error appears in the above-identified patent and that said Letters Patent is hereby corrected as shown below:

In the Claims

In Column 15, Line 57, in Claim 1, delete "agent" and insert -- agent; --, therefor.

Signed and Sealed this  
First Day of May, 2018

Andrei Iancu  
*Director of the United States Patent and Trademark Office*